United States Patent
Moussa et al.

(10) Patent No.: US 8,351,123 B2
(45) Date of Patent: Jan. 8, 2013

(54) DIFFRACTIVE HEAD-UP DISPLAY DEVICE PROVIDED WITH A DEVICE FOR ADJUSTING THE POSITION OF THE VIRTUAL IMAGE

(75) Inventors: Hassan Moussa, Illkirch (FR); Idriss El Hafidi, Strasbourg (FR); Laurent Tupinier, Reichstett (FR)

(73) Assignees: Delphi Technologies, Inc., Troy, MI (US); Universite Louis Pasteur

( * ) Notice: Subject to any disclaimer, the term of this patent is extended or adjusted under 35 U.S.C. 154(b) by 0 days.

(21) Appl. No.: 13/133,600

(22) PCT Filed: Dec. 9, 2009

(86) PCT No.: PCT/EP2009/066758
§ 371 (c)(1),
(2), (4) Date: Jul. 12, 2011

(87) PCT Pub. No.: WO2010/066804
PCT Pub. Date: Jun. 17, 2010

(65) Prior Publication Data
US 2011/0267701 A1    Nov. 3, 2011

(30) Foreign Application Priority Data

Dec. 9, 2008   (EP) .................................. 08171134
Dec. 9, 2008   (EP) .................................. 08171139

(51) Int. Cl.
*G02B 27/14*   (2006.01)
(52) U.S. Cl. .............. 359/630; 359/634; 359/9; 359/13; 349/6; 345/7

(58) Field of Classification Search ................ 359/9, 13, 359/15, 630, 632, 634; 345/7; 340/438; 349/6, 11; 353/11, 38; 438/32
See application file for complete search history.

(56) References Cited

U.S. PATENT DOCUMENTS

| | | | |
|---|---|---|---|
| 3,940,204 A * | 2/1976 | Withrington | 359/19 |
| 5,734,357 A * | 3/1998 | Matsumoto | 345/7 |
| 7,528,798 B2 * | 5/2009 | Harada et al. | 345/7 |
| 7,643,215 B2 * | 1/2010 | Shin et al. | 359/630 |
| 2005/0259034 A1 | 11/2005 | Harada et al. | |
| 2007/0279746 A1 | 12/2007 | Tupinier et al. | |
| 2011/0157667 A1 * | 6/2011 | Lacoste et al. | 359/9 |
| 2011/0164294 A1 * | 7/2011 | Shimizu | 359/13 |
| 2011/0261465 A1 * | 10/2011 | Moussa et al. | 359/630 |

FOREIGN PATENT DOCUMENTS

| | | |
|---|---|---|
| DE | 10 2006 017 666 | 11/2007 |
| EP | 0 880 287 | 11/1998 |
| EP | 1 862 841 | 12/2007 |
| FR | 2 900 475 | 11/2007 |

\* cited by examiner

*Primary Examiner* — Loha Ben
(74) *Attorney, Agent, or Firm* — Lawrence D. Hazelton

(57) ABSTRACT

A diffractive head up display device that includes a projection unit that uses a display to project an image through a projection window of an image mask, and towards a diffractive combiner. The display and the mask are moveable at right angles to the axis of the projection light beam, so that the adjustment of the position of the virtual image in the field of view of the observer, for example the driver of a vehicle, is obtained by translation of the display and of the mask.

6 Claims, 4 Drawing Sheets

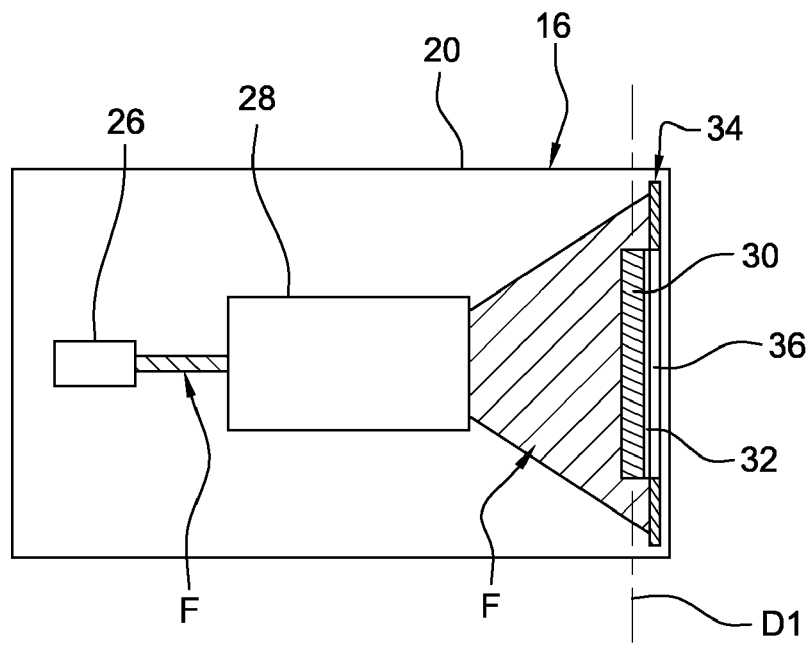
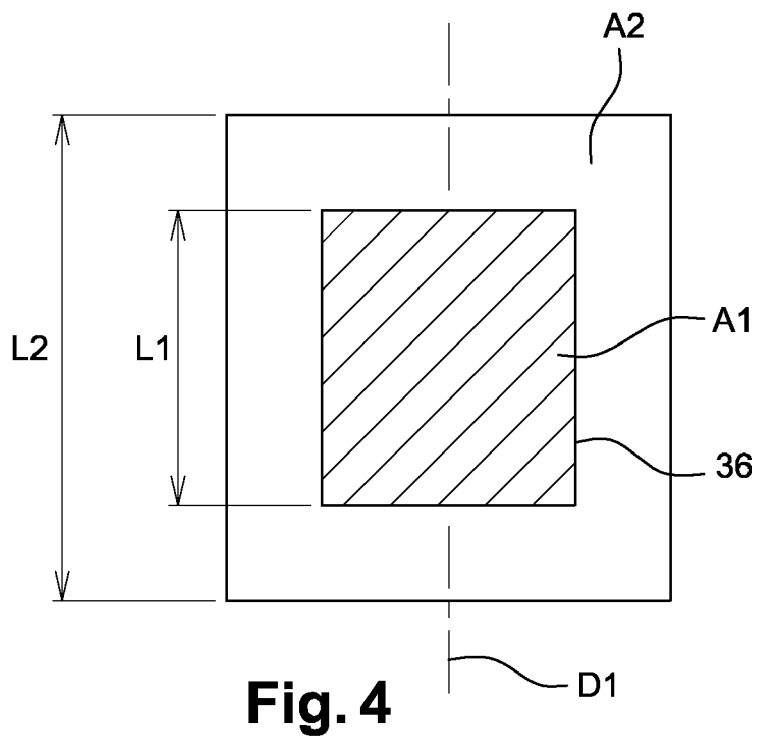

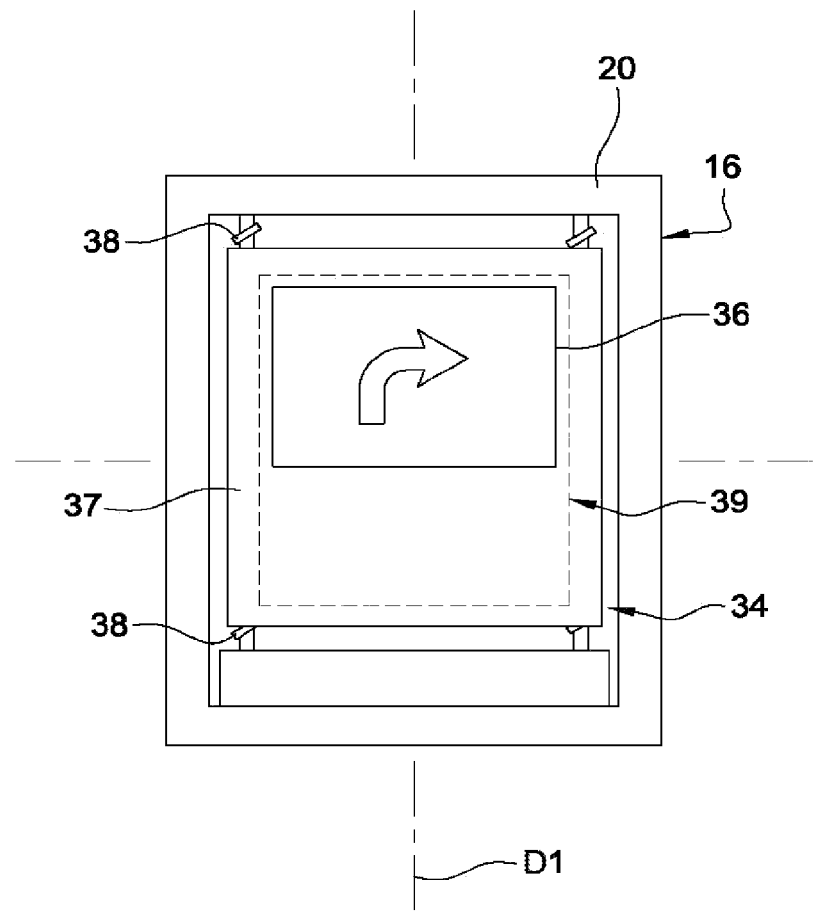
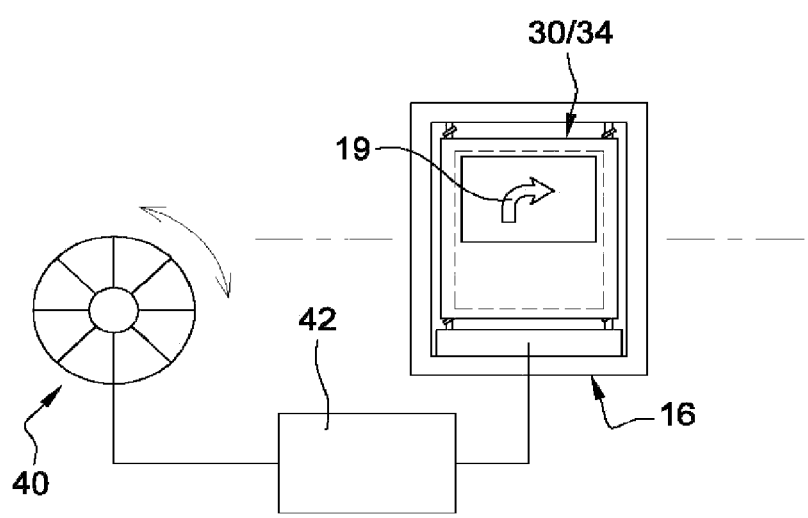

DIFFRACTIVE HEAD-UP DISPLAY DEVICE PROVIDED WITH A DEVICE FOR ADJUSTING THE POSITION OF THE VIRTUAL IMAGE

CROSS-REFERENCE TO RELATED APPLICATION

This application claims the benefit under 35 U.S.C. §371 of PCT Patent Application Number PCT/EP2009/066758, filed Dec. 9, 2009, which claims priority to EP08171139.2 and EP08171134.3 both filed Dec. 9, 2008, the entire disclosure of which are hereby incorporated herein by reference.

TECHNICAL FIELD

The present invention relates to a diffractive head up display device provided with a device for adjusting the position of the virtual image.

BACKGROUND OF INVENTION

In the Head Up Display function, the virtual image is placed in the field of view of the driver taking into account the ellipsis of his eyes and the real scene. It is, however, necessary to be able to adjust the position of the virtual image about its nominal position the better to adapt it to the height of the driver's seat, to his height and to the architecture of the vehicle.

In head up display devices based on the use of a series of minors, the position of the virtual image is adjusted by rotation of one (or more) mirrors about an axis. This solution is not applicable in the case of a diffractive head up display device having no minors and using diffractive components, in particular when the diffractive combiner has been made from a process for recording the diffractive elements which by design fixes the downward angle of view of the virtual image produced by the display device for a determined angle of illumination of the combiner.

SUMMARY OF THE INVENTION

The present invention is intended to propose a diffractive head up display device provided with a device for adjusting the position of the virtual image which can function without having to displace or pivot a mirror.

To this end, the present invention proposes a head up display device comprising a projection unit which produces a light beam directed towards a diffractive combiner provided to form a virtual image in the field of view of the observer, the projection unit comprising a light source which produces a projection light beam directed towards a display intended to form a source image transmitted to the diffractive combiner, characterized by the fact that the projection unit comprises a projection mask which is arranged after the display and which is provided with a projection window the area of which corresponds generally to the display area of the display, by the fact that, at the display, the light beam uniformly illuminates an area larger than the display area, and by the fact that the display and mask are movable in translation in at least one direction generally at right angles to the axis of the projection light beam, so that the position of the virtual image in the field of view of the observer, for example the driver of a vehicle, is adjusted by translation of the display and of the mask.

The solution of the invention is based on a movement of translation of the display and on a specific projection window.

In accordance with other features of the invention: the diffractive combiner is made in the form of a transparent plate provided with a series of diffractive optical elements arranged at the surface on a single layer and in which the downward angle of view of the virtual image is fixed by design on manufacture of the diffractive combiner for a determined angle of illumination.

In accordance with other features of the invention: the diffractive combiner is formed by injection or embossing from a mold, the said mold being obtained from the recording of a diffractive structure in relief comprising interference fringes themselves obtained by exposure of a photo-resistant layer by means of two interfering light beams.

In accordance with other features of the invention: the mask is fixed on the output face of the display.

In accordance with other features of the invention: the display is a liquid crystal display.

In accordance with other features of the invention: the diffractive display device comprises a control device with controls the position of the display and of the mask.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

Other features, aims and advantages of the invention will become apparent on reading the following detailed description, with reference to the attached drawings, given by way of non-limiting example and in which:

FIG. 3 is a view in axial section showing diagrammatically the projection unit of FIG. 1 provided with a display movable in translation in accordance with the invention;

FIG. 4 is a diagram showing the area of illumination and the display area of the projection unit of FIG. 1;

FIG. 7 is a frontal view showing diagrammatically the output of the projection unit of FIG. 1; and FIG. 8 is a diagram showing the control system of the projection unit of FIG. 1.

DESCRIPTION OF THE PREFERRED EMBODIMENTS

In the remainder of the description, identical or similar elements will be designated by the same references.

Figure 1:
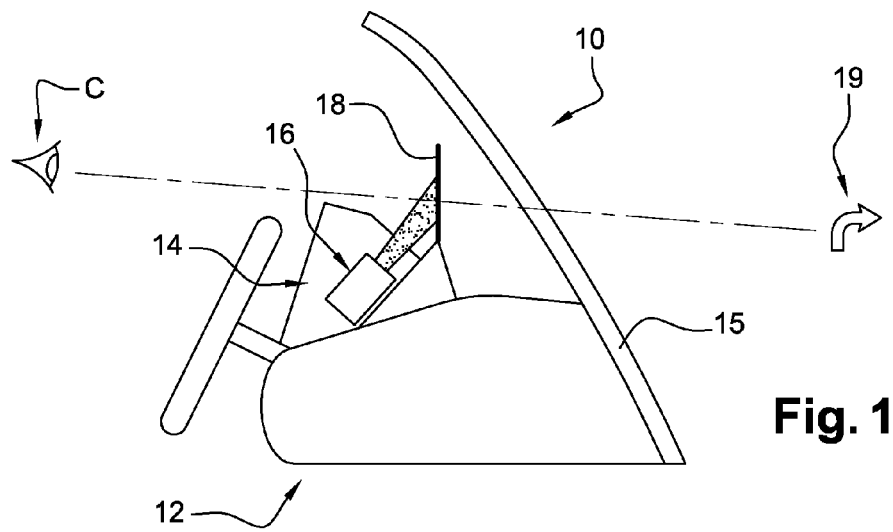
FIG. 1 is a diagrammatic view showing the passenger space of a motor vehicle provided with a head up diffractive display device in accordance with the teachings of the invention.

FIG. 1 shows diagrammatically the interior of a motor vehicle 10 including a dashboard 12 and a diffractive head up display device 14 formed in accordance with the teachings of the invention. In accordance with the embodiment shown, the diffractive head up display device 14 is arranged on the dashboard 12, in the proximity of the windscreen 15.

The diffractive head up display device 14 in accordance with the invention comprises a projection unit 16 and a holographic device 18 which is situated in the axis of view of the driver C and which is provided to display operating or driving information of the vehicle in the form of virtual images 19 positioned in front of the windscreen 15 in the field of view of the driver C.

Figure 2:
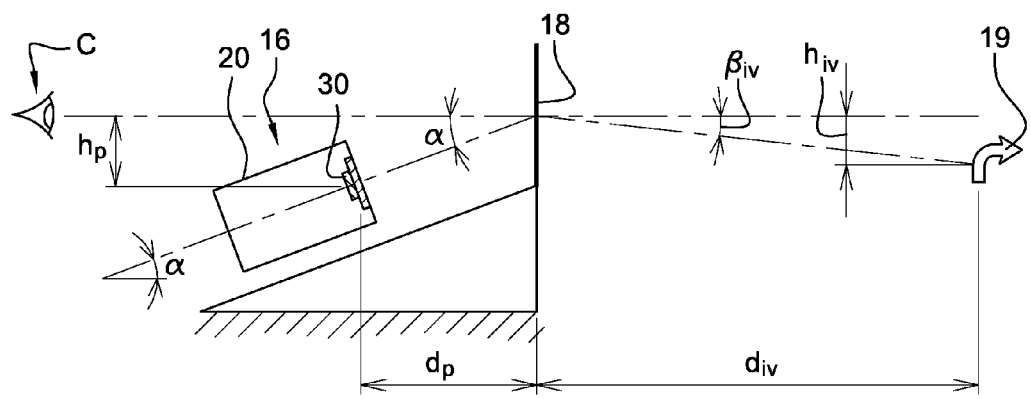
FIG. 2 is a view in axial section showing diagrammatically the projection unit and the diffractive combiner with which the diffractive display device of FIG. 1 is provided.

In accordance with the example embodiment shown in particular in FIGS. 2 and 3, the projection unit 16 is mounted inside a case 20. The case 20 contains a light source 26, preferably a laser diode emitting in the visible field, which produces a light beam F which is shaped by optical shaping elements 28 before being diffused towards a display 30 forming the source image. The display 30 is for example a liquid crystal display. The optical shaping elements 28 are intended to produce a light beam F of a shape matched to the shape of the display 30 and of a section which is a function of the adjustment interval of the virtual image. The display 30 is configured to produce source images showing the operating or driving information of the vehicle. The display 30 is preferably provided with an optical diffusion layer 32.

In accordance with the embodiment shown, the holographic device 18 is a diffractive combiner operating by reflection. The diffractive combiner 18 is arranged in the field of view of the driver C so that the light beam F from the source image is refracted through the diffractive combiner 18 to produce a virtual image 19 situated in front of the vehicle. Advantageously, the diffractive combiner 18 is a transparent piece comprising diffractive optical elements. The diffractive optical elements are configured to position the holographic virtual image 19 at a determined distance in front of the vehicle and they are also configured for a function of enlarging the source image.

The diffractive combiner 18 is preferably made of a plastics material by molding/injection or by embossing, from a matrix itself made by laser interference nano-lithography.

Figure 5:
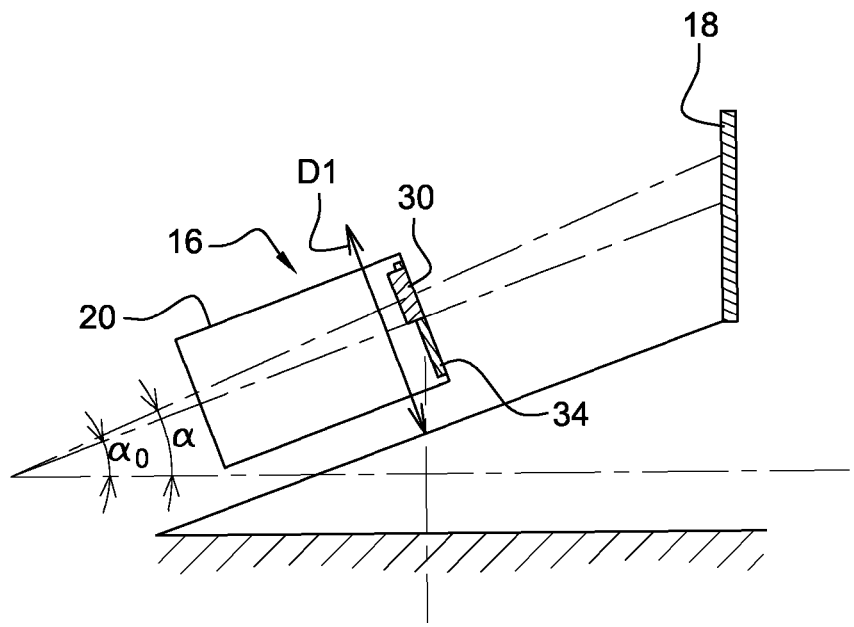
FIG. 5 is a view similar to that of FIG. 2 which shows the direction of translation of the display of FIG. 3.

In accordance with the teachings of the invention, the projection unit 16 comprises a projection mask 34 which is arranged after the display 30 and which is provided with a projection window 36 the area of which generally corresponds to the display area of the display 30, this window is displaced in translation. As shown in FIGS. 3 and 4, at the display 30, the light beam F uniformly illuminates an area A2 larger than the display area A1. As shown in FIG. 5, the display 30 and the mask 34 are moveable in translation, relative to the case 20, in a direction D1 generally at right angles to the axis of the projection light beam. The direction D1 is here contained in a substantially vertical plane. Thus, the adjustment of the position of the virtual image 19 in the field of view of the driver C is obtained by translation of the display 30 and of the mask 34 with its projection window 36.

As shown in FIG. 2, the virtual image 19 in the field of view of the driver C is defined through the diffractive combiner 18 by a downward viewing angle βiv and a distance div. Bragg's law associates the illumination angle α of the combiner 18, corresponding to the angular position of the projection unit 16, with the downward viewing angle βiv by the equation:

$$\alpha = \text{Arc}\sin((\lambda/d) - \sin(\beta iv)) \qquad \text{Eq. 1}$$

in which:
λ: wavelength of the light
d: pitch of the diffraction grating of the combiner.

As shown previously, the following equations can be written:

$$\alpha = \text{Arc}\tan(hp/dp) \qquad \text{Eq. 2}$$

$$\alpha = \text{Arc}\tan(hiv/div). \qquad \text{Eq. 3}$$

Therefore, by varying the value of α, the value of the downward viewing angle βiv can be varied.

The present invention permits variation of the position of the virtual image 19 by varying the position of the display/mask assembly.

The display 30 is illuminated by the device 28 for shaping the light beam, diffractive or otherwise. The illumination spot obtained on the surface of the display 30 is uniform.

The height difference L2–L1 between the area of illumination A2 and the display area A1 corresponds to the length of translation necessary to vary the angle α and thus the angle βiv to allow adjustment of the position of the virtual image 19.

FIG. 5 shows the direction D1 of translation of the display 30 in the case of the projection unit 16. The display 30 is translated in the direction D1 while the case 20 of the projection unit 16 and the combiner 18 remain fixed. This movement of translation varies the value of the angle α about a central value α0 corresponding to an initial configuration (nominal position of the virtual image) of the diffractive display device 14.

Figure 6:
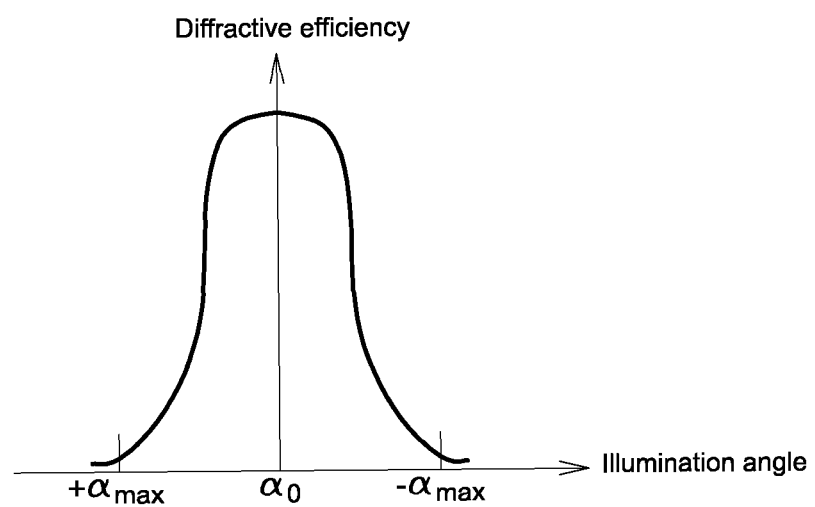
FIG. 6 is a diagram showing the diffraction efficiency of the combiner of FIG. 2 as a function of the angle of illumination.

As shown in FIG. 6, the variation interval of the angle α must respect the diffraction efficiency curve of the combiner 18.

As shown in FIG. 7, the body 37 of the mask 34 around the window 36 ensures that only the display 30 is seen by the combiner 18. A mechanical system 38, for example a screw-nut system, provides the displacement in translation of the display 30 about an initial position such as shown in FIG. 7. The mask 34 is preferably made of elastic material and fixed on the output face of the display 30 so as to mask the unused part of the illumination spot 39.

As shown in FIG. 8, the driver C can adjust the position of the virtual image 19 through a human/machine interface 40 and an electronic control unit 42 which are provided to control the translation of the display 30 and of the mask 34.

Advantageously, the invention is particularly suited to a head up diffractive display device 14 comprising a diffractive combiner 18 obtained by a process of manufacture effected by laser interference nano-lithography. Such a process preferably includes the following steps:

a) deposition of a photo-resistant layer of uniform thickness on a flat surface of a solid substrate;

b) exposure on the photo-resistant layer of the interference fringes due to the interference of two light beams from a laser source;

c) application for a predetermined period of a chemical engraving substance to the photo-resistant layer to transform the interference fringes into variation of relief of the photo-resistant layer and create a matrix;

d) deposition of a conductive layer on the relief surface;

e) application of an electroforming process to the conductive layer to obtain a mold; and f) use of the said mold to transfer the diffractive relief structure from the substrate onto a homogeneous transparent plastics element forming the diffractive combiner.

Advantageously, step b) is effected from two light beams from a same laser source with an angle θi between the two beams equal to:

$$\alpha = \text{Arc}\sin((\lambda e/\lambda i) \cdot \sin(\theta p)). \qquad \text{Eq. 4}$$

One of the interfering beams is divergent and presents a spherical wave front and the other is a flat wave, their interference generating a diffractive grating of variable pitch with curved fringe contour lines.

In fact, the first step of the process consists of creating a matrix for the subsequent manufacture of molds permitting mass production. This matrix is formed of a substrate, made of rigid material, on which is deposited a photo-resistant layer sensitive to the wavelength of the laser source used, which is always the same, only the angle between the two beams being modified from one step to the other.

Conventionally, the two light beams from the same source are sent onto the flat surface of the photo-resistant layer, causing interference fringes over the whole of the exposed surface. The existence of these interferences leads to a variable exposure of the surface of the photo-sensitive layer, which is then subjected to a chemical substance having the property of dissolving the material depending on its degree of exposure.

Chemical engraving is consequently produced, to the extent that the interference fringes are transformed into variation of relief after dissolution of certain parts of the layer of photo-resistant material.

The exposure at a plurality of angles (for one of the two beams) leads in this case to the manufacture of a combiner with a multiplexed grating at the surface, capable of restoring non-superimposed distinct colors, in accordance with an incident beam from a projecting device distinguishing zones of different colors.

Then, the relief surface is subjected to a deposition of a thin conductive layer, permitting subsequent application of electroforming processes to obtain a mold. The latter is then used to transform the diffractive structure into relief on a transparent plastics element by mass production means such as embossing or injection. It is thus possible to obtain a monolayer combiner made of transparent plastics, the diffractive structures of which are engraved on the surface, and are in fact relief surface diffractive gratings.

Obtaining a relief on the matrix by chemical engraving allows the diffraction efficiency of the final combiner to be controlled by simply controlling the depth of relief on the surface of the matrix, in particular by adjusting the chemical engraving time. This is another major advantage of the invention and of the existence of the diffraction gratings on the surface of a transparent substrate: The luminance only depends on the diffraction efficiency, not on the material selected or on its refractive index.

Finally, the process of the invention allows a combiner to be obtained made of transparent plastics material in the form of a plastics plate of flat appearance one of the surfaces of which comprises diffractive structures, which allows working both in transmission and reflection, with different refraction efficiencies. Reflection corresponds for example to the integration of a combiner in the windscreen.

The invention claimed is:

1. Diffractive head up display device comprising a projection unit that projects an image in a direction towards a diffractive combiner to display a virtual image in a field of view of an observer, wherein the projection unit comprises a light source that projects a projection light beam directed along an axis towards a display configured to project the image onto the diffractive combiner, wherein the projection unit comprises a projection mask that defines a projection window positioned between the combiner and the display, wherein the area of the projection window corresponds to a display area of the display, wherein the light beam uniformly illuminates an area of the display larger than the display area defined by the mask, and wherein the display and the mask are movable in a direction substantially normal to the axis of the projection light beam, so that adjustment of the position of the virtual image in the field of view of the observer is obtained by movement of the display and of the mask.

2. Diffractive head up display device as claimed in claim 1, wherein the diffractive combiner is made in the form of a transparent plate provided with a series of diffractive optical elements arranged at the surface on a single layer, and wherein a downward angle of view of the virtual image is determined by the optical elements on the diffractive combiner based on a determined angle of illumination.

3. Diffractive head up display device as claimed in claim 2, wherein the diffractive combiner is formed by one of injection into a mold and embossing by a mold, the said mold corresponding to a recording of a diffractive structure in relief comprising interference fringes themselves obtained by exposure of a photo-resistant layer to two interfering light beams.

4. Diffractive head up display device as claimed in claim 1, wherein the mask is fixed on the output face of the display.

5. Diffractive head up display device as claimed in claim 1, wherein the display is a liquid crystal display.

6. Diffractive head up display device as claimed in claim 1, wherein the display device comprises a control device that controls the position of the display and of the mask.

* * * * *